United States Patent
Yeh et al.

(10) Patent No.: US 7,596,220 B2
(45) Date of Patent: Sep. 29, 2009

(54) ECHO CANCELLATION USING ADAPTIVE IIR AND FIR FILTERS

(75) Inventors: Chiang Yeh, Sierra Madre, CA (US); Harpal Mann, Union City, CA (US)

(73) Assignee: Alcatel Lucent, Paris (FR)

( * ) Notice: Subject to any disclaimer, the term of this patent is extended or adjusted under 35 U.S.C. 154(b) by 753 days.

(21) Appl. No.: 11/028,357

(22) Filed: Dec. 30, 2004

(65) Prior Publication Data
US 2006/0147031 A1 Jul. 6, 2006

(51) Int. Cl.
*H04M 9/08* (2006.01)
(52) U.S. Cl. .............................. 379/406.08; 379/406.01
(58) Field of Classification Search ............ 379/406.01, 379/406.08
See application file for complete search history.

(56) References Cited

U.S. PATENT DOCUMENTS

| 5,305,309 A * | 4/1994 | Chujo et al. ................. 370/290 |
| 6,256,383 B1 | 7/2001 | Chen |
| 6,263,078 B1 * | 7/2001 | McLaughlin et al. ... 379/406.08 |
| 2003/0076950 A1 * | 4/2003 | Usman et al. .......... 379/406.08 |

OTHER PUBLICATIONS

Widrow, Bernard and Stearns, Samuel D., Adaptive Signal Processing, 1985, pp. 99-101 and pp. 154-161, Prentice-Hall Signal Processing Series, 1985 by Prentice-Hall, Inc., Englewood Cliffs, New Jersey, 07632.

* cited by examiner

*Primary Examiner*—Alexander Jamal

(57) ABSTRACT

Disclosed is a method and system adapted to receive an input signal from a far end transmission, to take in a near end return signal, and to inject into the return signal, prior to sending the return to the far end, a corrective signal whereby, for example, echoes in the return signal may be reduced or cancelled. A first exemplary embodiment includes one or more adaptive infinite impulse response (IIR) filters and one or more adaptive finite-impulse response filters (FIR) filters running in parallel each having an output that may be selected as the corrective signal based on filter performance determinations. A second exemplary embodiment includes an adaptive FIR filter outputting the corrective signal where the adaptive FIR filter has selected for it, based on filter performance determinations, an output of one or more adaptive IIR filters or a conditioned return signal selected as a reference.

17 Claims, 3 Drawing Sheets

ECHO CANCELLATION USING ADAPTIVE IIR AND FIR FILTERS

FIELD OF THE INVENTION

The present invention relates to methods and systems of echo cancellation and particularly to method and systems of achieving echo cancellation using an adaptive Infinite Impulse Response (IIR) filter and an adaptive Finite-Impulse Response (FIR) filter.

BACKGROUND

In transmission or communication system, signals originating from a far end of a communication circuit are received at a near end of the circuit. The received signals, either electrically or acoustically, may find their way into the return path along with near-end input. Far-end reception of the near-end input may include an attenuated and delayed reflection, i.e., an echo, of the original far-end input signals. In telephone systems, whether wired or wireless, these echo phenomena can make a conversation unintelligible. In data communication systems, again whether wired or wireless, such echoes can cause errors in transmission or otherwise degrade throughput performance.

Adaptive filters are used in numerous applications to remove undesired frequency content from a signal and are used in telecommunication systems as echo cancellation systems to remove from a signal echoes that may arise as a result of the reflection and/or unwanted coupling of input signals back to the originator of the input signals. For example, echoes occur in instances where signals that were emitted from a loudspeaker are then received and retransmitted through a microphone, i.e., acoustic echo, or when reflections of a far-end signal are generated in the course of transmission along wiring junctions where impedance mismatch occur, i.e., line echo.

Presently, an adaptive finite-impulse response (FIR) filter may be used to reduce or eliminate the echo where the echo cancellation characteristics are defined in the International Telecommunication Union-Standardization Sector (ITU-T) Recommendations G.165 and G.168 and the contents of each of the foregoing ITU Recommendations being incorporated herein by reference as if set forth in full. FIG. 1 illustrates a functional block diagram of an echo cancellation circuit 150 interposed between the far end and the near end of a telecommunication system 100 where the echo cancellation circuit operates at a near end 102. The near-end input 130 to return signal 132 is shown as combining with a near-end echo signal 122 represented by the far-end input signal 110 as filtered by, that is, as attenuated and delayed by, the z-domain echo transfer function 120, H(z). The resulting return signal 132 is represented then as a linear combination of the near-end input signal 130 and the near-end echo signal 122.

Accordingly, when a digital representation of the echo transfer function is in the form of an adaptive FIR 156, and the gains are adjusted to mimic the echo transfer function 120, when the far-end input signal 110 is filtered by the adaptive FIR 156, the resulting signal 158 may be differenced with the return signal 132 to cancel the echo from the return line signal 132. As illustrated in FIG. 1, to accomplish this canceling effect, the post-cancellation return line signal 140 is directed into a nonlinear processing module 152 that may pre-filter background or ambient noise and establish a threshold above which little or no adaptation of the IIR filter is permitted. The threshold logic is us used to address the double talk situations where the return signal may have both near-end input and echo in temporal proximity. If the pre-filtered return line signal is below the threshold, it may be used, at each step k, as an error signal 154, $e_k$, to drive the adaptation of the gains the FIR filter 156. The FIR filter may require several delay states with each output or input state being tapped, multiplied by a gain and summed. The gains for the FIR filter may be chosen to represent the most likely echo transfer function 120, H(z), and subsequently, these gains may be adjusted by relationships driven by the error signal, $e_k$. Least-mean-square (LMS) adaptive algorithms are commonly implemented in adaptive cancellation devices to adjust the gains of the adaptive FIR filter. A FIR filter may be represented as $$H_k(z) = \sum_{n=0}^{L} h_{n,k} \cdot z^{-n} \qquad [1]$$

A typical rule of adaptation or adjustment of the FIR filter gains is to use the product of the error signal 154, the normalized input signal, and a step size, or adapting gain, $\beta$, to adjust the gains. For example, for each filter coefficient, n, where n=0, 1, 2, ... L:

$$h_{n,k+1} = h_{n,k} + \beta * e(k) * x_{k-1}/x_{max}. \qquad [2]$$

FIR filters typically require a long tap delay to model effectively an echo return path. FIR filters, while stable representations of all zero transfer functions, are typically slow to adapt, require more memory than recursive filters memory, and, due to the number of taps, can be computationally cumbersome.

With certain types of input signal, such as human speech, are characterized by the dominance of distinct peaks followed by a long decay over time. A majority of the computation is devoted to FIR coefficient update on the long decay portion of the signal, which actually contributed little significance to the actual echo energy. In addition, performing aggressive adaptive filtering on these low energy decays actually causes error in estimation in many types of adaptive FIR filters, e.g. normalized LMS filters, and degrades the overall echo cancellation performance.

Infinite impulse response (IIR) filters, or recursive filters, are implemented forms of pole-zero transfer functions that do not require a long tap delay. Typically, IIR filters are used to numerically mimic very specific echo return paths in which stability of the pole-zero transfer function can be guaranteed during adaptation. In addition, the poles must be properly represented numerically and thus practical embodiments in digital signal processing require a high degree of precision in implementation because small bit errors can cause large filter errors including instability. Methods of adaptation mechanisms are known to those of ordinary skill in the art and are found described in *Adaptive Signal Processing,* by Bernard Widrow and Samuel D. Stearns, Prentice-Hall, Inc., Englewood Cliffs, N.J., 1985, particularly pages 99-101 and 154-161.

Accordingly, there remains a need for the rapid convergence of an IIR filter and the stability of an FIR filter to be applied to echo cancellation. The present invention, in its several embodiments provides echo cancellation using an adaptive IIR filter and an adaptive FIR filter.

SUMMARY

The invention, in its several embodiments, provides a method and system adapted to receive an input signal, to receive a return signal, and to inject into the return signal a corrective signal, which by way of exemplary application, appreciably cancels echoes in communication systems. A first exemplary system includes a return signal conditioning module adapted to receive the return signal and output a conditioned return signal and an adaptive IIR filter adapted to receive the input signal, wherein the adaptive IIR filter is also adapted to receive one or more gain adjustments from an IIR gain adaptation mechanism that itself is adapted to receive an IIR filter error signal derived from the difference of the adaptive IIR filter output and the conditioned return signal. The first exemplary embodiments also includes an adaptive FIR filter that is adapted to receive the input signal, wherein the adaptive FIR filter is also adapted to receive one or more gain adjustments from its FIR gain adaptation mechanism that itself is adapted to receive a FIR filter error signal that is preferably derived from the difference of the adaptive FIR filter output and the conditioned return signal. In addition, the first exemplary embodiment includes a selector, or selector subsystem or selection module, that is adapted to receive the IIR filter error signal and the FIR filter error signal and adapted to select the corrective signal from the FIR filter output and the IIR filter output preferably based one or more derived performance measures. The exemplary first embodiment may include one or more adaptive IIR filters and one or more adaptive FIR filters from which the corrective signal selection is made.

A second exemplary system includes: a nonlinear processing module adapted to receive the return signal and output a conditioned return signal and an adaptive IIR filter that is adapted to receive the input signal, wherein the adaptive IIR filter is also adapted to receive one or more gain adjustments from its IIR gain adaptation mechanism that itself is adapted to receive an IIR filter error signal derived from the difference of the adaptive IIR filter output and the conditioned return signal. The second exemplary system embodiment also includes an adaptive FIR filter that is adapted to receive the input signal and output the corrective signal, wherein the adaptive FIR filter is also adapted to receive one or more gain adjustments from its FIR filter gain adaptation mechanism that itself is adapted to receive a FIR filter error signal that is preferably derived from the difference of the corrective signal and a signal preferably selected from either the adaptive FIR filter output and the conditioned return signal preferably based one or more derived performance measures.

BRIEF DESCRIPTION OF THE DRAWINGS

The present invention is illustrated by way of example and not limitation in the figures of the accompanying drawings, and in which.

DETAILED DESCRIPTION OF THE INVENTION

Adaptive IIR filters have been long prevalent in modeling acoustic signals, particularly due to their effectiveness in mimicking specific decaying behavior. The use of one or more adaptive IIR filters in echo canceling applications, to the exclusion of other filter structures, is not done due to the wide varying range of conditions in the common echo return paths. Nevertheless, these filters offer many advantages that are desired in echo cancellation when combined with adaptive FIR filters.

Figure 2:
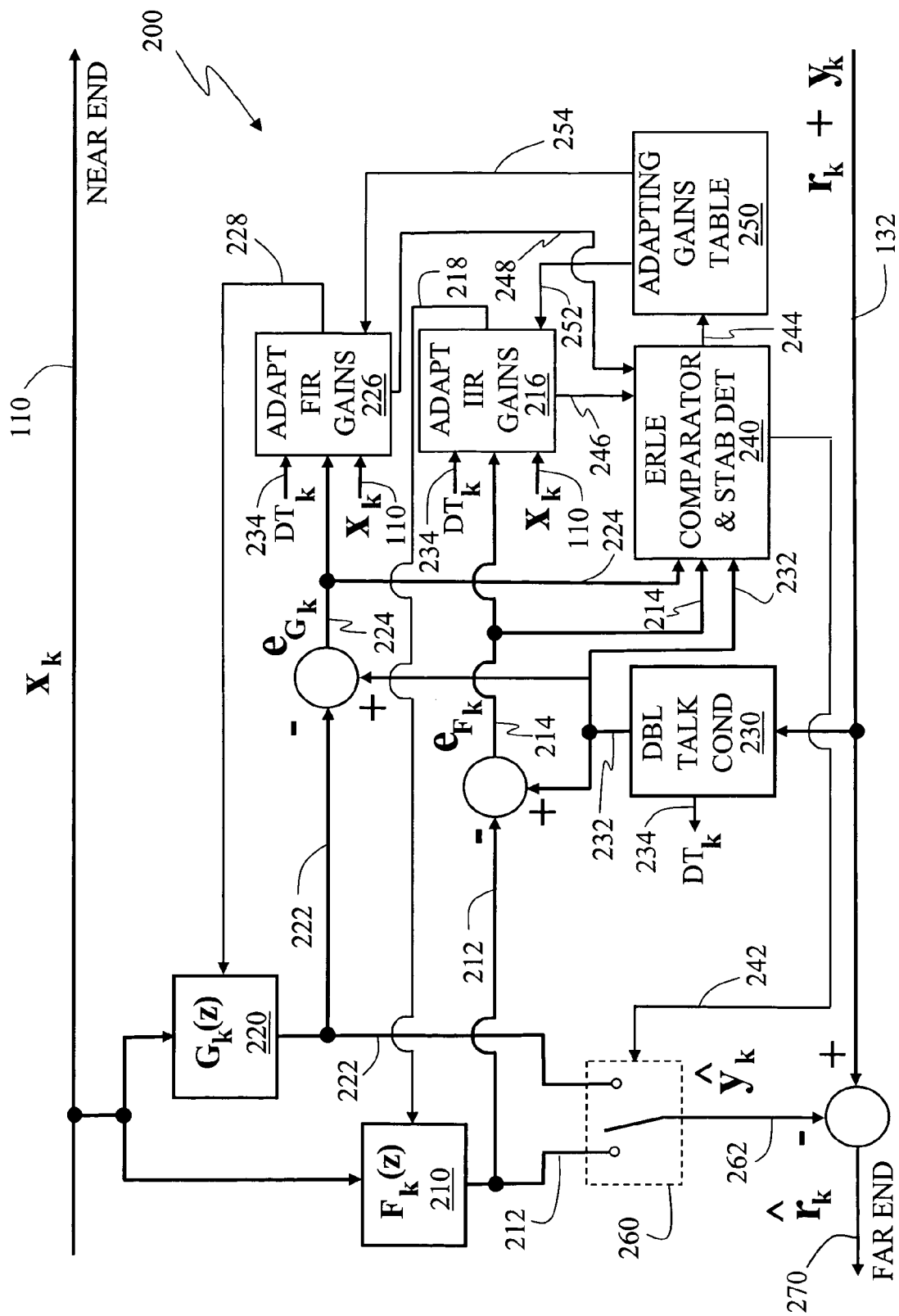
FIG. 2 is a functional block diagram of an exemplary embodiment of the present invention.

FIG. 2 illustrates an exemplary embodiment of the present invention as an echo canceling device 200 where the input signal 110, $x_k$ is sent both to an adaptive IIR filter 210, $F_k(z)$, and an adaptive FIR filter 220, $G_k(z)$. The adaptive FIR filter 220, $G_k(z)$, may be represented as the a sum of L taps weighted by adjustable weights or one or more delay states each having a feed-forward gains, $g_n$, for n=0, 1, 2, . . . L. For example, at each time step, k, and for L+1 coefficients, the adaptive FIR filter 220, $G_k(z)$, may be represented as:

$$G_k(z) = \sum_{n=0}^{L} g_{n,k} \cdot z^{-n}. \quad [3]$$

The adaptive IIR filter may be represented with poles and zeros or feed-forward gains, $b_n$, for n=0, 1, 2, . . . L, and feedback gains, $a_n$, for n=1, 2, . . . L. For example, at each time step, k, and for L+1 feed-forward coefficients and L feedback coefficients, the adaptive IIR filter 210, $F_k(z)$, may be represented as:

$$F_k(z) = \frac{\sum_{n=0}^{L} b_{n,k} \cdot z^{-n}}{1 + \sum_{n=1}^{L} a_{n,k} \cdot z^{-n}}. \quad [4]$$

While one adaptive FIR filter and one adaptive IIR filter have been illustrated by example in FIG. 2, the present embodiment is readily extendable to more than one adaptive FIR filter having an adaptation mechanism and more than one adaptive IIR filter having an adaptation mechanism.

Both adaptive filters 210, 220 have coefficients that may be adjusted, or adapted, during the course of the operation of the echo canceling device 200. The return signal 132 is sent through nonlinear processing (NLP) module 230 for conditioning with the NLP module preferably executing functions including line noise filtering and a double talk threshold testing. The output of the adaptive IIR filter 212 is subtracted from the conditioned return signal 232 and provided as an IIR filter error signal 214, $e_{F_k}$, to the adaptive IIR filter adaptation mechanism 216. Similarly, the adaptive FIR filter 220 generates an output signal 222 using the far end input signal 110 as input. The adaptive FIR filter output 212 is subtracted from the conditioned return signal 232 and provided as an FIR filter error signal 224, $e_{G_k}$, to the adaptive FIR filter adaptation mechanism 226. Preferably, the IIR error signal 214, $e_{F_k}$, is used to assess the real time performance of the FIR filter and the FIR error signal 224, $e_{G_k}$, is used to assess the real time performance of the IIR filter. The derived performance measures are preferably used to select, from the outputs of the adaptive filters, a signal to inject into the return signal path in order to cancel the echo.

Derived performance measures may also require the return signal. The Echo Return Loss Enhancement (ERLE) is typically defined as the amount of echo signal reduction between the echo signal, e.g., $y_k$, and the error signal, $e_k = y_k - \hat{y}_k$. So, for example, the ERLE(dB) may be calculated for K time steps according to:

$$ERLE(\text{dB}) = 10\log\left(\frac{E[y^2(k)]}{E[e^2(k)]}\right). \qquad [5]$$

Poor reductions in the error signal tend to indicate poor fits to the echo signal and may indicate where a filter is behaving erratically, and for the IIR filters, may be working with an unstable set of coefficients.

Other performance measures that may establish a performance-based selection rule include the magnitude of filter coefficient adjustments over time steps. For example, an indication of an unstable adaptation mechanism may be discerned from the time history of the adjusted coefficients indicating variations inconsistent with settling into a best fit.

Figure 1:
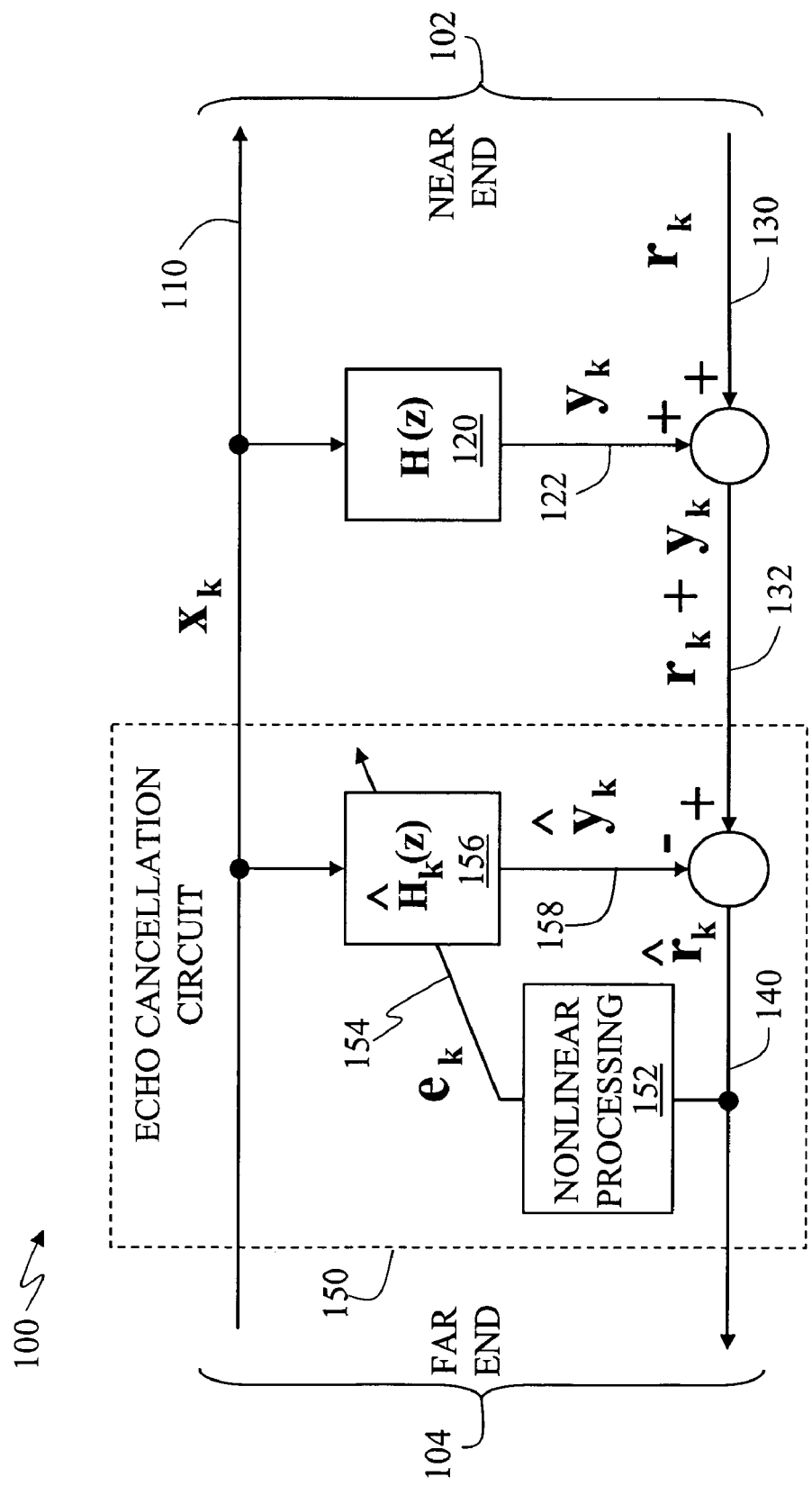
FIG. 1 is a functional block diagram of the prior art.

On a performance basis, such as, but not limited to, the ERLE, the IIR filter output 212 or the FIR filter output 222 is selected and used as the echo signal estimate $\hat{y}_k$ 262, which is presumed the signal having the best estimate of the echo signal 122, $y_k$, (FIG. 1) and accordingly subtracted from the return signal 132 to yield the near-end input signal estimate 270, $\hat{r}_k$. The IIR error signal 214, $e_{F_k}$, may be used to assess and detect the state of the IIR filter 210 stability, by for example the mean squared error algorithm. Should instability of the adaptive IIR filter 210 be detected, the switch 260 is preferably thrown to select the FIR filter output 222 as the echo signal estimate $\hat{y}_k$ 262. With the selection of the FIR filter output 222, the IIR filter is preferably reset and may use a new set of gains selected from a matrix having initial gain sets stored in constituent vectors and the IIR adaptation step size may be adjusted. Additional noise filtering may be applied to the estimated input signal as well preferably prior to sending the estimated input signal 270, $\hat{r}_k$, to the far end.

Preferably, the FIR adaptation mechanism 226 may also be used to determine the stability of the adaptive IIR filter 210 and its adaptation mechanism 216. For example, the stability detector 240 may continually monitor 248 the relative changes in the filter coefficients of the adaptive FIR filter and its ERLE to determine that the FIR adaptation mechanism 226 has become stable or otherwise self-adjusting in very small and consistent steps. Concurrently, the stability detector 240 is preferably provided the relative changes 246 in the IIR filter gain coefficient values. If the IIR adaptation mechanism 216 is updating its coefficients wildly and producing varying ERLE while the adaptation mechanism of the FIR 226 has settled into a set of gain values consistent over time, the adaptive IIR filter is preferably reset. The stability detector 240 may use ERLE and or other performance measures to assess a preferred filter output as the corrective signal 262 to subtract form, or inject into, the return signal 132. The stability detector 240 may be included in a switching mechanism, or selector subsystem or selector, to effect the selection of the corrective signal or the switching mechanism may be a separate module 260.

Preferably, the selection of one of the outputs 212, 222 of the adaptive filters 210, 220, $F_k(z)$ and $G_k(z)$, is tied 244 to an increase in the step size, or $\beta$, or the value of the adapting gain, in the adaptation mechanism of the unselected filter and is also preferably tied 244 to a decrease in the step size, $\beta$, or adapting gain value, in the adaptation mechanism of the selected filter. These step sizes are preferably stored in a table of adapting gains 250. Accordingly, a new adapting gain for the adaptive FIR adaptation mechanism 254 and a new adapting gain for the adaptive IIR adaptation mechanism 252 may be provided should a selection 242 be sent to throw the switch 260.

The adaptive FIR filter adaptation mechanism 226 preferably has a set of initial gains. The gains may stored in a table 250 as a vector of gains where a matrix of these gain vectors may provide for the selection of more than one initial set of filter gains. The initial set of gains may be adjusted at each time step according to an adaptation process. For example, each FIR filter coefficient may increased or decreased by adding to the last coefficient value the product of the step size, $\beta$, the error signal, $e_{G_k}$, the normalized far-end input signal, $X_k/X_{max}$. In addition, the adaptation mechanism 226 may be halted or the step size reduced temporarily should the double talk threshold test on the return signal 132, $r_k+y_k$ detect a double talk state $(DT_k)$ 234.

The adaptive IIR filter adaptation mechanism 216 also preferably has a set of initial gains. As with the adaptive FIR filter 220, the gains may stored as a vector of gains where a matrix of these gain vectors may provide for the selection of more than one initial set of filter gains from a table 250. The initial set of gains may be adjusted at each time step according to an adaptation process. Algorithms for recursive adaptive filters preferably include the LMS algorithms, hyperstable adaptive recursive filter algorithms, and sequential regression algorithms. For a minimal number of executions, the LMS algorithms are presently preferred. In addition, the adaptation mechanism of the IIR may be halted or the step size reduced temporarily should the threshold test on the return signal, $r_k+y_k$ detect a double talk state $(DT_k)$ 234.

Figure 3:
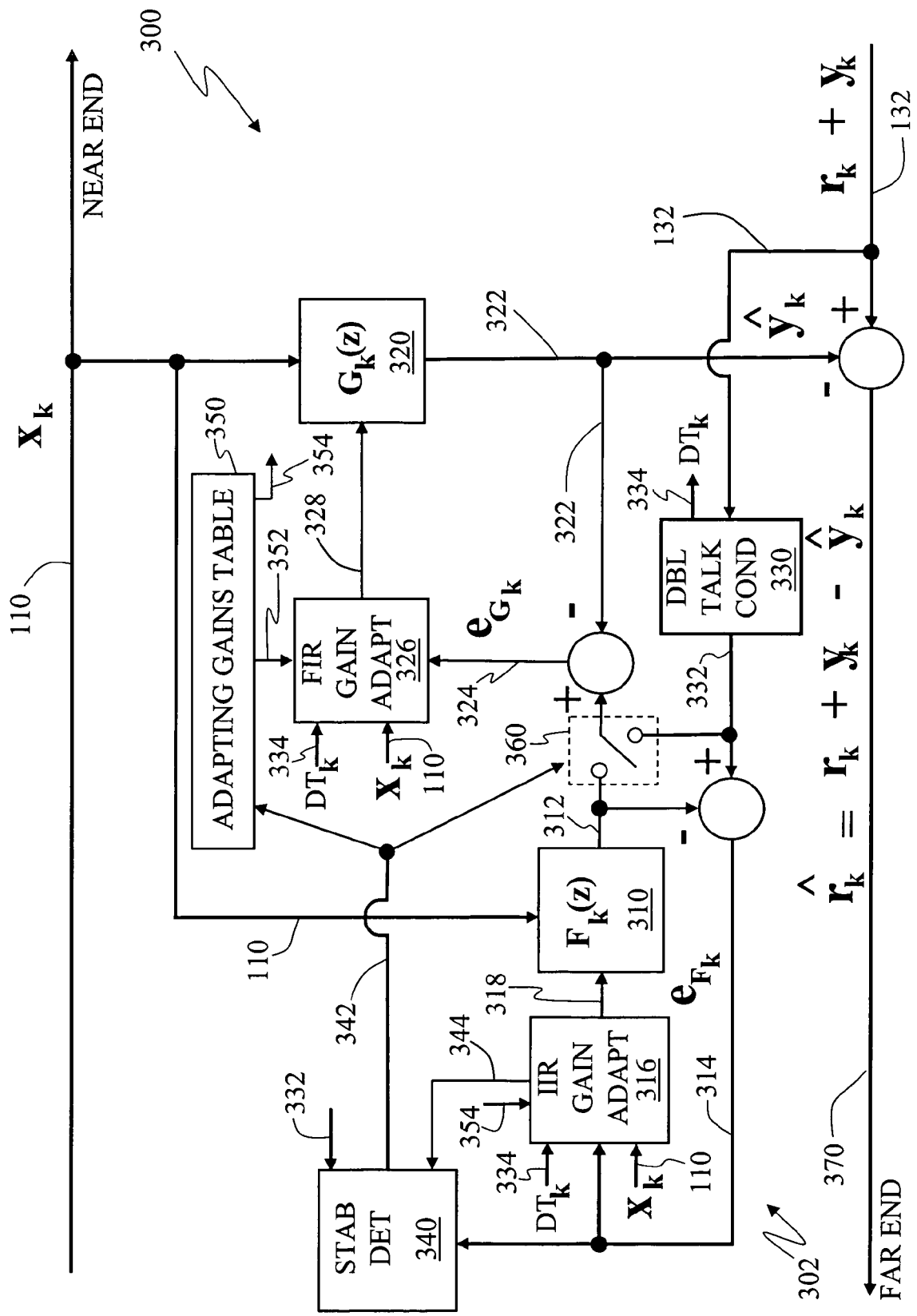
FIG. 3 is a functional block diagram of another exemplary embodiment of the present invention.

FIG. 3 illustrates an exemplary functional block diagram of an alternative embodiment 300 of the present invention. In this example, the far-end input signal 110, $X_k$, is provided to both the adaptive FIR 320, $G_k(z)$, and the adaptive IIR 310, $F_k(z)$. The output of the adaptive FIR filter 322, $\hat{y}_k$, is presumed the best estimate of the echo signal 122 and subtracted from the return signal 132, $r_k+y_k$, to yield the estimated input signal 370, $\hat{r}_k$. Additional noise filtering may be applied to the estimated input signal 370 as well prior to sending the estimated input signal to the far end.

The return signal 132 having both the near-end input signal, $r_k$ and an echo signal, $y_k$, is provided to a nonlinear processing module 330 for conditioning where the return signal 132 is preferably filtered for noise and a double talk threshold test is preferably applied. The output of the adaptive IIR filter 312 is subtracted from the conditioned return signal 332 yielding the IIR filter error signal 312, $e_{F_k}$, where the IIR filter error signal in turn drives, in part, the IIR adaptation mechanism 316. Preferably the IIR mechanism 316 uses an LMS algorithm taking in the far-end input signal 110, $X_k$, and the IIR filter error signal 312, $e_{F_k}$, and other adaptation algorithms for recursive filters may be used instead or in combination such as for example hyperstable adaptive recursive filter algorithms and sequential regression algorithms. By this adaptive IIR filter stage 302, the echo canceller 300 prepares the adaptive IIR filter 310 as an echo model reference for the adaptive FIR filter 320. Accordingly, more than one adaptive IIR filter may be used where the selection of the reference for the adaptive FIR filter 320 is based on determined performance characteristics of all of the adaptive IIR filters.

The adaptive IIR filter output 312 is subtracted from the FIR filter output 322 yielding the FIR filter error signal 324, $e_{G_k}$, where this FIR filter error signal 322 in turn drives, in part, the FIR adaptation mechanism 326. The FIR adaptation mechanism 326 preferably uses an LMS algorithm taking in the far-end input signal 110, $X_k$, and the FIR filter error signal 324, $e_{G_k}$, as described above and other adaptation algorithm may be used instead or in combination. The adapting gains, or step sizes, $\beta$, of the FIR adaptation mechanism 326 are preferably drawn 352 from a table 350 where larger adapting gains may be used for the FIR adaptation mechanism 326 when the adaptive IIR filter 310 is used as the echo reference to aggressively drive the adaptive FIR 320 to converge, that is to drive the FIR filter error signal 324, $e_{G_k}$, to zero. Accordingly, a stability detecting module 340 is preferably used to monitor the IIR filter error signal 312, $e_{F_k}$, and monitor 344 the adjustments to the IIR filter gains as generated by the IIR adaptation mechanism 316. Once the stability detecting module has determined the IIR filter 310 is processing in a stable fashion typically driving the IIR filter error signal 314, $e_{F_k}$, to or near zero and consistently sustaining this level. Preferably based on the determinations 342 of stability detecting module 340, the step sizes for the FIR adaptation mechanism 326 preferably provided by the adapting gains table 350 may be increased 352 and the step sizes for the IIR adaptation mechanism 315 preferably provided by the adapting gains table 350 may be increased 354 may be decreased.

Preferably based on a double talk state ($DT_k$) 334 provided by a nonlinear processing module 330 having double talk threshold-based detection, both the IIR adaptation mechanism 316 and the FIR adaptation mechanism 326 preferably reduce or halt their respective adaptation mechanisms should a double talk state 334 be signaled by the nonlinear processing module 330. In addition, the IIR error signal 314, $e_{F_k}$, is preferably monitored for stability using for example the mean squared error compared with a stability threshold. In addition, continued large adjustments of the IIR gains may be provided 344 to the stability detection module 344 by the IIR adaptation mechanism 316 for determining the stability of the IIR adaptation mechanism. A selector subsystem may include both the stability detection module 430 and a switch 360 or the selector subsystem may be distributed within the system. If the instability threshold is achieved, the stability detection module 340 preferably signals 342 the switch 360 so the output of the FIR filter 322 is subtracted from the conditioned return signal 332 and the IIR gains are reset and may be supplied a new set of gains that are selected from a matrix having gains represented in vectors. Once the IIR is reset, the switch 360 may reset to derive the FIR error signal from the IIR output. In addition, the IIR adapting gain may be selected from a table 350 having values lower in step size than that previously used in the unstable event.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

Many alterations and modifications may be made by those having ordinary skill in the art without departing from the spirit and scope of the invention and its several embodiments disclosed herein. Therefore, it must be understood that the illustrated embodiments have been set forth only for the purposes of example and that it should not be taken as limiting the invention as defined by the following claims.

We claim:

1. A method comprising:
   generating a first infinite impulse response (IIR) error signal by differencing a conditioned return signal and an input signal filtered by a first adaptive IIR filter wherein the first adaptive IIR filter comprises at least one feed-forward gain and at least one feedback gain adapted to be adjusted via a first IIR adaptation mechanism and wherein the first IIR adaptation mechanism is adapted to receive the generated first IIR error signal;
   selecting a signal from a group of signals comprising the input signal filtered by the first adaptive IIR filter and the conditioned return signal; and
   generating a finite-impulse response (FIR) error signal by differencing the selected signal and an input signal filtered by an adaptive FIR filter, wherein the adaptive FIR filter comprises at least one feed-forward gain adapted to be adjusted via a FIR adaptation mechanism and wherein the FIR adaptation mechanism is adapted to receive the generated FIR error signal;
   using the IIR error signal to assess and detect a stability state of the first adaptive IIR filter and when an instability of the first adaptive IIR filter is detected, selecting an output of the adaptive FIR filter as an echo signal estimate and resetting the first adaptive IIR filter.

2. The method as claimed in claim 1 further comprising the step of subtracting the input signal filtered by the adaptive FIR filter from a return signal.

3. The method as claimed in claim 1 wherein the selecting of the signal from a group of signals comprising the input signal filtered by the first adaptive IIR filter and the conditioned return signal is based on the generated first IIR error signal.

4. The method as claimed in claim 1 wherein the selecting of the signal from a group of signals comprising the input signal filtered by the first adaptive IIR filter and the conditioned return signal is based on magnitudes of first IIR filter gain adjustments over a period of time.

5. The method as claimed in claim 1 wherein the conditioned return signal is a return signal subjected to noise filtering.

6. The method as claimed in claim 1 wherein the conditioned return signal is a return signal tested to determine a double talk state.

7. The method as claimed in claim 1 wherein the first IIR adaptation mechanism and the FIR adaptation mechanism is adapted to receive the determined double talk state.

8. The method as claimed in claim 1 further comprising: generating a second IIR error signal by differencing a conditioned return signal and an input signal filtered by a second adaptive IIR filter wherein the second adaptive IIR filter comprises at least one feed-forward gain and at least one feedback gain adapted to be adjusted via a second IIR adaptation mechanism and wherein the second IIR adaptation mechanism is adapted to receive the generated second IIR error signal; and wherein the group of signals from which the selected signal is selected further comprises the second adaptive IIR filter output.

9. A system adapted to receive an input signal, to receive a return signal, and to inject into the return signal a corrective signal, the system comprising:
   a nonlinear processing module adapted to receive the return signal and output a conditioned return signal;
   a first adaptive infinite impulse response (IIR) filter adapted to receive the input signal, wherein the first adaptive FIR filter is farther adapted to receive one or more gain adjustments from a first IIR gain adaptation mechanism, and wherein the first IIR gain adaptation mechanism is adapted to receive a first IIR filter error signal derived from the difference of an output of the first adaptive IIR filter and the conditioned return signal; and
   an adaptive finite-impulse response (FIR) filter adapted to receive the input signal and output the corrective signal, wherein the adaptive FIR filter is further adapted to receive one or more gain adjustments from a FIR gain adaptation mechanism, and wherein the FIR gain adaptation mechanism is adapted to receive a FIR filter error signal derived from the difference of the corrective signal and a signal selected from a group of signals comprising the output of the first adaptive IIR filter and the conditioned return signal;

wherein the IIR error signal assess and detects a stability state of the first adaptive IIR filter and when an instability of the first adaptive IIR filter is detected, an output of the adaptive FIR filter is selected as an echo signal estimate and the first adaptive IIR filter is reset.

10. The system as claimed in claim 9 wherein the nonlinear processing module is further adapted to determine and output a state of double talk; and wherein the first IIR adaptation mechanism is further adapted to receive the double talk state indicator and effect a change in an IIR adapting gain based on the received double talk state indicator; and wherein the first FIR adaptation mechanism is further adapted to receive the double talk state indicator and effect a change in an FIR adapting gain based on the received double talk state indicator.

11. The system as claimed in claim 10 wherein the nonlinear processing module is further adapted to condition the return signal by noise filtering.

12. The system as claimed in claim 9 wherein the first FIR adaptation mechanism has at least one first FIR adapting gain, or first FIR gain adjustment step size, that is dependent on the selection of the signal with which the corrective signal is differenced and wherein the first IIR adaptation mechanism has at least one first IIR adapting gain, or first IIR gain adjustment step size, that is dependent on the selection of the corrective signal.

13. The system as claimed in claim 12 further comprising a selector subsystem adapted to determine the selection from the group of signals comprising the output of the first adaptive IIR filter and the conditioned return signal based on a derived performance measure.

14. The system as claimed in claim 12 wherein the selector subsystem is further adapted to receive the first IIR filter error signal.

15. The system as claimed in claim 12 wherein the selector subsystem is further adapted to receive a plurality of magnitudes of first IIR filter gain adjustments over a period of time and a plurality of magnitudes of FIR filter gain adjustments over a period of time.

16. The system as claimed in claim 12 wherein the selector subsystem is further adapted to receive a plurality of magnitudes of first IIR filter gains over a period of time and a plurality of magnitudes of FIR filter gains over a period of time.

17. The system as claimed in claim 9 further comprising a second adaptive IIR filter adapted to receive the input signal, wherein the second adaptive IIR filter is further adapted to receive one or more gain adjustments from a second IIR gain adaptation mechanism, and wherein the second IIR gain adaptation mechanism is adapted to receive a second IIR filter error signal derived from the difference of an output of the second adaptive IIR filter and the conditioned return signal; and wherein the group of signals from which the selected signal is selected further comprises the second adaptive IIR filter.

* * * * *

UNITED STATES PATENT AND TRADEMARK OFFICE
CERTIFICATE OF CORRECTION

PATENT NO. : 7,596,220 B2 Page 1 of 1
APPLICATION NO. : 11/028357
DATED : September 29, 2009
INVENTOR(S) : Yeh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1066 days.

Signed and Sealed this

Twenty-eighth Day of September, 2010

David J. Kappos
*Director of the United States Patent and Trademark Office*